(12) United States Patent
Zhou

(10) Patent No.: US 6,872,784 B2
(45) Date of Patent: Mar. 29, 2005

(54) MODIFIED RUBBER-BASED ADHESIVES

(75) Inventor: Peiguang Zhou, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 156 days.

(21) Appl. No.: 09/944,627

(22) Filed: Aug. 31, 2001

(65) Prior Publication Data

US 2002/0122953 A1 Sep. 5, 2002

Related U.S. Application Data

(60) Provisional application No. 60/259,037, filed on Dec. 29, 2000.

(51) Int. Cl.⁷ .......................... C08L 23/04; C08L 25/08; B32B 27/08
(52) U.S. Cl. .................... 525/240; 525/241; 428/517
(58) Field of Search .................. 525/240; 524/241; 428/517, 341

(56) References Cited

U.S. PATENT DOCUMENTS

| | | | |
|---|---|---|---|
| 3,325,562 A | 6/1967 | Peterkin | 525/155 |
| 3,338,992 A | 8/1967 | Kinney | 264/441 |
| 3,341,394 A | 9/1967 | Kinney | 442/366 |
| 3,370,106 A | 2/1968 | Hall, Jr. et al. | 525/240 |
| 3,492,372 A | 1/1970 | Flanagan | 525/210 |
| 3,502,538 A | 3/1970 | Petersen | 428/359 |
| 3,502,763 A | 3/1970 | Hartmann | 264/555 |
| 3,542,615 A | 11/1970 | Dobo et al. | 156/181 |
| 3,634,546 A | 1/1972 | Hagemeyer | 525/88 |
| 3,635,861 A | 1/1972 | Russell | 524/271 |
| 3,686,107 A | 8/1972 | Russell | 524/274 |
| 3,692,618 A | 9/1972 | Dorschner et al. | 442/401 |
| 3,717,601 A | 2/1973 | Jurrens | 260/27 EV |
| 3,802,817 A | 4/1974 | Matsuki et al. | 425/66 |
| 3,849,241 A | 11/1974 | Butin et al. | 161/169 |
| 3,850,858 A | 11/1974 | Park | 524/271 |
| 3,862,068 A | 1/1975 | Russell | 260/27 |
| 3,887,442 A | 6/1975 | Gilchrist | 204/72 |
| 3,900,694 A | 8/1975 | Jurrens | 428/513 |
| 3,982,051 A | 9/1976 | Taft et al. | 427/207 |
| 4,013,816 A | 3/1977 | Sabee et al. | 428/288 |
| 4,022,728 A | 5/1977 | Trotter et al. | 524/528 |
| 4,041,203 A | 8/1977 | Brock et al. | 428/157 |
| 4,072,735 A | 2/1978 | Ardemagni | 260/897 A |
| 4,112,208 A | 9/1978 | McConnell et al. | 526/57 |
| 4,120,916 A | 10/1978 | Meyer, Jr. et al. | 260/897 A |
| 4,143,858 A | 3/1979 | Schmidt, III et al. | 526/48.2 |
| 4,178,272 A | 12/1979 | Meyer, Jr. et al. | 260/27 R |
| 4,186,258 A | 1/1980 | Schmidt, III et al. | 525/342 |
| 4,221,696 A | 9/1980 | Cook et al. | 260/42.46 |
| 4,259,220 A | 3/1981 | Bunnelle et al. | 260/27 |
| 4,296,750 A | 10/1981 | Woon et al. | 128/287 |
| 4,340,563 A | 7/1982 | Appel et al. | 264/518 |
| 4,366,292 A | 12/1982 | Werner et al. | 525/240 |

(Continued)

FOREIGN PATENT DOCUMENTS

| | | |
|---|---|---|
| EP | 0205242 B2 | 4/1986 |
| EP | 0 217 032 | 4/1987 |
| EP | 0285430 A2 | 3/1988 |

(Continued)

OTHER PUBLICATIONS

Joseph, Marjory L., Introductory Textile Science 1986, p. 1, Holt, Rinehart and Winston, New York.

*Primary Examiner*—Monique R. Jackson
(74) *Attorney, Agent, or Firm*—Senniger Powers

(57) ABSTRACT

Elastic attachment adhesive compositions of conventional rubber-based construction adhesive and a crystalline polymer have improved bond strength over conventional elastic attachment adhesives. The addition of a crystalline polymer to conventional rubber-based elastic attachment adhesive also results in elastic attachment adhesive compositions having improved bond strength. These elastic attachment adhesive compositions are particularly suitable for use in absorbent articles.

12 Claims, 8 Drawing Sheets

U.S. PATENT DOCUMENTS

| | | | | |
|---|---|---|---|---|
| 4,460,728 | A | 7/1984 | Schmidt, Jr. et al. | 524/271 |
| 4,493,868 | A | 1/1985 | Meitner | 428/171 |
| 4,554,304 | A | 11/1985 | Hansen et al. | 524/291 |
| 4,568,713 | A | 2/1986 | Hansen et al. | 524/291 |
| 4,573,991 | A | 3/1986 | Pieniak et al. | 604/385 A |
| 4,610,681 | A | 9/1986 | Strohbeen et al. | 604/396 |
| 4,641,381 | A | 2/1987 | Heran et al. | 2/400 |
| 4,719,261 | A | 1/1988 | Bunnelle et al. | 525/97 |
| 4,761,450 | A | 8/1988 | Lakshmanan et al. | 524/488 |
| 4,762,520 | A | 8/1988 | Wallstrom | 604/366 |
| 4,784,892 | A | 11/1988 | Storey et al. | 428/172 |
| 4,798,603 | A | 1/1989 | Meyer et al. | 604/378 |
| 4,824,889 | A | 4/1989 | Mostert | 524/232 |
| 4,826,909 | A | 5/1989 | Lakshmanan et al. | 524/478 |
| 4,833,192 | A | 5/1989 | Lakshmanan et al. | 524/476 |
| 4,857,594 | A | 8/1989 | Lakshmanan et al. | 525/98 |
| 4,937,138 | A | 6/1990 | Mostert | 428/286 |
| 4,939,202 | A | 7/1990 | Maletsky et al. | 524/528 |
| 4,940,464 | A | 7/1990 | Van Gompel et al. | 604/396 |
| 4,949,668 | A | 8/1990 | Heindel et al. | 118/314 |
| 4,998,928 | A | 3/1991 | Maletsky et al. | 604/365 |
| 5,026,752 | A | 6/1991 | Wakabayashi et al. | 524/271 |
| 5,096,532 | A | 3/1992 | Neuwirth et al. | 156/580.1 |
| 5,110,403 | A | 5/1992 | Ehlert | 156/580.1 |
| 5,176,668 | A | 1/1993 | Bernardin | 604/368 |
| 5,176,672 | A | 1/1993 | Bruemmer et al. | 604/385.1 |
| 5,192,606 | A | 3/1993 | Proxmire et al. | 428/284 |
| 5,211,792 | A | 5/1993 | Carter | 156/245 |
| 5,213,881 | A | 5/1993 | Timmons et al. | 428/224 |
| 5,219,633 | A | 6/1993 | Sabee | 428/109 |
| 5,334,446 | A | 8/1994 | Quantrille et al. | 428/284 |
| 5,336,545 | A | 8/1994 | Morman | 428/152 |
| 5,397,846 | A | 3/1995 | Eichhorn et al. | 525/383 |
| 5,468,320 | A | 11/1995 | Zafiroglu | 156/148 |
| 5,472,792 | A | 12/1995 | Tsurutani et al. | 428/516 |
| 5,478,891 | A | 12/1995 | Lakshmanan et al. | 525/240 |
| 5,482,761 | A | 1/1996 | Palumbo et al. | 428/198 |
| 5,498,463 | A | 3/1996 | McDowall et al. | 428/198 |
| 5,512,625 | A | 4/1996 | Butterbach et al. | 524/490 |
| 5,516,848 | A | 5/1996 | Canich et al. | 525/240 |
| 5,530,054 | A | 6/1996 | Tse et al. | 524/474 |
| 5,539,056 | A | 7/1996 | Yang et al. | 525/240 |
| 5,548,014 | A | 8/1996 | Tse et al. | 524/477 |
| 5,670,580 | A | 9/1997 | Tazaki et al. | 525/240 |
| 5,705,011 | A | 1/1998 | Bodford et al. | 156/244.22 |
| 5,723,546 | A | 3/1998 | Sustic | 525/240 |
| 5,763,534 | A | 6/1998 | Srinivasan et al. | 525/240 |
| 5,773,515 | A | 6/1998 | Srinivasan et al. | 525/240 |
| 5,786,418 | A | 7/1998 | Strelow et al. | 524/579 |
| 5,902,297 | A | 5/1999 | Sauer | 604/385.1 |
| 5,904,672 | A | 5/1999 | LeMahieu et al. | 604/378 |
| 5,904,675 | A | 5/1999 | Laux et al. | 604/385.2 |
| 5,939,483 | A | 8/1999 | Kueppers | 524/487 |
| 5,985,971 | A | 11/1999 | Srinivasan et al. | 524/425 |
| 5,998,524 | A | 12/1999 | Srinivasan et al. | 524/425 |
| 6,008,148 | A | 12/1999 | Harris et al. | 442/381 |
| 6,024,822 | A | 2/2000 | Alper et al. | 156/273.3 |
| 6,034,159 | A | 3/2000 | Malcolm | 524/243 |
| 6,045,895 | A | 4/2000 | Hyde et al. | 428/213 |
| 6,080,818 | A | 6/2000 | Thakker et al. | 525/240 |
| 6,087,550 | A | 7/2000 | Anderson-Fischer et al. | 604/364 |
| 6,114,261 | A | 9/2000 | Strelow et al. | 442/153 |
| 6,143,818 | A | 11/2000 | Wang et al. | 524/528 |
| 6,184,294 | B1 | 2/2001 | Park et al. | 525/191 |
| 6,207,748 | B1 | 3/2001 | Tse et al. | 524/579 |
| 6,211,272 | B1 | 4/2001 | Shafer et al. | 524/270 |
| 6,218,457 | B1 | 4/2001 | Fralich et al. | 524/489 |
| 6,235,356 | B1 * | 5/2001 | Shibuya et al. | 428/34 |
| 6,239,047 | B1 | 5/2001 | Erdos et al. | 442/119 |
| 6,248,832 | B1 | 6/2001 | Peacock | 525/191 |
| 6,248,834 | B1 * | 6/2001 | Mori | 525/214 |
| 6,284,943 | B1 | 9/2001 | Osborn, III et al. | 604/366 |
| 6,288,171 | B2 * | 9/2001 | Finerman et al. | 525/192 |
| 6,329,468 | B1 | 12/2001 | Wang | 525/240 |
| 2001/0010990 | A1 | 8/2001 | Erdos et al. | 442/394 |
| 2002/0010265 | A1 | 1/2002 | Johnson et al. | 525/74 |
| 2002/0019187 | A1 | 2/2002 | Carroll et al. | 442/394 |
| 2002/0039637 | A1 | 4/2002 | Meece et al. | 428/103 |
| 2002/0098353 | A1 | 7/2002 | Kollaja et al. | 428/355 AC |

FOREIGN PATENT DOCUMENTS

| | | |
|---|---|---|
| EP | 0315013 A2 | 5/1989 |
| EP | 0758675 A2 | 2/1997 |
| EP | 1039007 A1 | 8/1999 |
| EP | 1050612 A1 | 5/2000 |
| JP | 62-081470 | 10/1985 |
| JP | 62081470 | 4/1987 |
| JP | 63303109 | 5/1987 |
| JP | 01111016 | 10/1987 |
| JP | 10086256 | 9/1996 |
| JP | 10168726 | 12/1996 |
| JP | 11290381 | 4/1998 |
| JP | 2000314068 | 5/1999 |
| WO | WO 86/07242 A1 | 12/1986 |
| WO | WO 96/06966 A1 | 3/1996 |
| WO | WO 98/37144 * | 8/1998 |
| WO | WO 99/14039 A1 | 3/1999 |
| WO | WO 99/25296 | 5/1999 |
| WO | WO 00/37723 A2 | 6/2000 |
| WO | WO 00/44412 A1 | 8/2000 |
| WO | WO 01/15646 A1 | 3/2001 |
| WO | WO 01/49913 A1 | 7/2001 |
| WO | WO 02/22344 A1 | 9/2001 |

* cited by examiner

MODIFIED RUBBER-BASED ADHESIVES

CROSS REFERENCE TO RELATED APPLICATION

This application claims the benefit of U.S. Provisional Application Ser. No. 60/259,037, filed Dec. 29, 2000.

BACKGROUND OF THE INVENTION

People rely on disposable absorbent articles to make their lives easier. Disposable absorbent articles, such as adult incontinence articles and diapers, are generally manufactured by combining several components. These components typically include a liquid-permeable topsheet; a liquid-impermeable backsheet attached to the topsheet; and an absorbent core located between the topsheet and the backsheet. When the disposable article is worn, the liquid-permeable topsheet is positioned next to the body of the wearer. The topsheet allows passage of bodily fluids into the absorbent core. The liquid-impermeable backsheet helps prevent leakage of fluids held in the absorbent core. The absorbent core generally is designed to have desirable physical properties, e.g. a high absorbent capacity and high absorption rate, so that bodily fluids can be transported from the skin of the wearer into the disposable absorbent article.

Frequently one or more elastomeric components of a disposable absorbent article are adhesively bonded together. For example, adhesives have been used to bond individual layers of the absorbent article, such as the topsheet (also known as, for example, the body-side liner) and backsheet (also known as, for example, the outer cover), together. Adhesives have also been used to bond discrete pieces, such as fasteners and leg elastics, to the article. In many cases, the bonding together of components forms a laminated structure in which adhesive is sandwiched between materials (such as layers of polymer film and/or layers of woven or nonwoven fabrics) that make up the components being bonded together.

In many instances, a construction adhesive, an elastic attachment adhesive, or a hot-melt adhesive, i.e. a polymeric formulation that is heated to substantially liquefy the formulation prior to application to one or both materials when making a laminate, is used in making a laminated structure. While such formulations generally work, they can be costly and their performance properties can be improved. For example, adhesion can be improved to help provide a sturdier laminate (e.g., to improve the integrity or strength of the bond between two components in a disposable absorbent article), particularly laminates including elastic substrates.

There is a need or desire for an elastic attachment adhesive composition that possesses one or more performance characteristics that are comparable to, or better than, one or more of the same performance characteristics (e.g., elastic bond strength) of a conventional elastic attachment adhesive and that will typically cost less than a conventional elastic attachment adhesive. Laminated structures and disposable absorbent articles employing the adhesive composition would benefit from these improved characteristics. There is also a need or desire for efficient methods of making the adhesive composition, and efficient methods of making laminated structures and disposable absorbent articles employing the adhesive composition.

SUMMARY OF THE INVENTION

The present invention is generally directed to blends of current construction adhesives having improved elastic bonding strength through the addition of a crystalline polymer. The present invention is also directed to blends of current elastic attachment adhesives having improved elastic bonding strength through the addition of a crystalline polymer. The adhesive compositions have better performance characteristics, e.g. elastic bonding strengths, than conventional elastic attachment adhesives, and may cost less than conventional elastic attachment adhesives. In general, much higher adhesion and cohesion are required for an elastic attachment adhesive to effectively bond elastic strands compared to the adhesion and cohesion required for bonding non-elastic material.

The combination of current construction adhesives, such as rubber-based adhesives, and a crystalline polymer, such as isotactic polypropylene, possesses desirable adhesive properties and may be used to make laminated structures and disposable absorbent articles. Similarly, the combination of current elastic attachment adhesives, such as rubber-based adhesives, and a crystalline polymer, such as isotactic polypropylene, also possesses desirable adhesive properties and may be used to make laminated structures and disposable absorbent articles. The adhesive compositions of the invention can be applied to a wide variety of substrates, including nonwoven webs, woven webs, films, and elastic strands, and is particularly beneficial when used with elastomeric substrates. The adhesive can be applied in a swirl pattern, can be melt-blown, or can be applied using an ITW application process or any other technique suitable for elastic attachment adhesives.

Without being bound to any particular theory, it appears that an improvement in bonding strength of the adhesive compositions of the invention, compared to conventional elastic attachment adhesives, may be attributed to crystallization of the crystalline polymer, such as isotactic polypropylene, which generates physical intermolecular linking in the matrix of rubber-based adhesive. More particularly, the rubber-based adhesive may include diblock, triblock, tetrablock or other multi-block elastomeric copolymers such as olefinic copolymers, including styrene-isoprene-styrene (SIS), styrene-butadiene-styrene (SBS), styrene-ethylene/propylene-styrene (SEPS), ethylene-propylene-diene-monomer (EPDM), styrene/ethylene-co-butadiene/styrene (SEBS), and/or styrene-poly(ethylene-propylene)-styrene-poly(ethylene-propylene) (SEPSEP). It is in these elastomeric copolymers which physical intermolecular linking appears to occur.

As stated above, a material comprising a combination of a conventional construction adhesive or a conventional elastic attachment adhesive, such as a rubber-based adhesive, and crystalline polymer, such as isotactic polypropylene, may cost less than a conventional elastic attachment adhesive alone. Generally this is because conventional elastic attachment adhesives are typically formulated by combining several components, including a polymer or polymers for cohesive strength; resins, tackifiers, or other generally low molecular-weight materials for adhesive strength; viscosity modifiers such as oils or wax-like materials; and other additives (e.g., antioxidants). Through the combination of a crystalline polymer, the adhesive properties of the conventional adhesives are improved, such that less adhesive may be required per application than conventionally applied.

In some versions of the invention, a combination of conventional construction adhesive and crystalline polymer provides improved bond characteristics compared to conventional elastic attachment adhesives. The invention also includes a combination of conventional elastic attachment adhesive and crystalline polymer having improved bond characteristics compared to conventional elastic attachment adhesives alone. But it should be understood that the invention encompasses adhesive compositions that include selected construction adhesives, or elastic attachment adhesives, and crystalline polymers, combined with other additives or materials.

Apart from whether or not elastic attachment adhesive compositions of the present invention cost less than conventional elastic attachment adhesives, representative embodiments of the present invention appear to possess improved performance characteristics compared to the performance characteristics of conventional elastic attachment adhesives. These performance benefits may justify adhesive compositions of the present invention, in some instances, being at a higher cost than conventional elastic attachment adhesives.

These and other features, aspects, and advantages of the present invention will become better understood with regard to the following description, appended claims, and accompanying drawings.

DETAILED DESCRIPTION OF THE PRESENTLY PREFERRED EMBODIMENTS

Figure 1A:
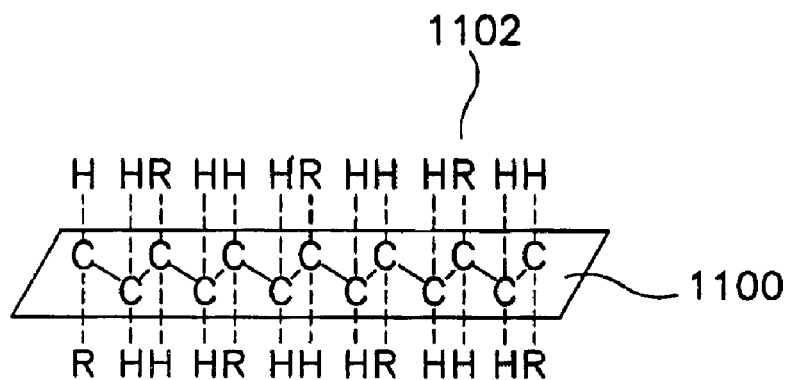
FIG. 1 gives symbolic representations of syndiotactic, isotactic, and atactic configurations of a polymer.

The present invention is generally directed to elastic attachment adhesive compositions comprising a rubber-based adhesive and a crystalline polymer. Adhesive compositions of the present invention generally perform better, and typically cost less, than conventional elastic attachment adhesives. Furthermore, these compositions may typically be processed and applied using conventional hot-melt adhesive processing equipment. Generally new equipment will not be necessary to use adhesive compositions of the present invention.

Before describing representative embodiments of the invention, it is useful to define a number of terms for purposes of this application. These definitions are provided to assist the reader of this document.

"Nonwoven" fabric or web means a web having a structure of individual fibers or threads that are interlaid, but not in a regular or identifiable manner as in a knitted fabric. Nonwoven fabrics or webs have been formed from many processes such as, for example, meltblowing processes, spunbonding processes, air laying processes, and bonded carded web processes. The basis weight of nonwoven fabrics is usually expressed in ounces of material per square yard (osy) or grams per square meter (gsm) and the fiber diameters are usually expressed in microns. (Note: to convert from osy to gsm, multiply osy by 33.91.)

"Woven" fabric or web means a fabric or web containing a structure of fibers, filaments, or yarns, which are arranged in an orderly, inter-engaged fashion. Woven fabrics typically contain inter-engaged fibers in a "warp" and "fill" direction. The warp direction corresponds to the length of the fabric while the fill direction corresponds to the width of the fabric. Woven fabrics can be made, for example, on a variety of looms including, but not limited to, shuttle looms, rapier looms, projectile looms, air jet looms, and water jet looms.

"Spunbonded fibers", or "spundbond fibers", means small-diameter fibers that are typically formed by extruding molten thermoplastic material as filaments from a plurality of fine capillaries of a spinneret having a circular or other configuration, with the diameter of the extruded filaments then being rapidly reduced as by, for example, in U.S. Pat. No. 4,340,563 to Appel et al., and U.S. Pat. No. 3,692,618 to Dorschner et al, U.S. Pat. No. 3,802,817 to Matsuki et al, U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al., each of which is incorporated by reference in its entirety and in a manner consistent with the present document. Spunbond fibers are quenched and generally not tacky when they are deposited onto a collecting surface. Spunbond fibers are generally continuous and often have average diameters larger than about 7 microns, and more particularly between about 10 and 30 microns. A spunbond material, layer, or substrate comprises spunbonded (or spunbond) fibers.

The term "meltblown fibers" means fibers formed by extruding a molten material, typically thermoplastic in nature, through a plurality of fine, usually circular, die capillaries as molten threads or filaments into converging high-velocity heated gas (e.g., air) streams that attenuate the filaments of molten material to reduce their diameter, which may be to microfiber diameter. Thereafter, the meltblown fibers are carried by the high-velocity gas stream and are deposited on a collecting surface to form a web of randomly dispersed meltblown fibers. Such a process is disclosed for example, in U.S. Pat. No. 3,849,241 to Butin. Meltblown fibers are microfibers which may be continuous or discontinuous, are generally smaller than 10 microns in diameter, and are generally self-bonding when deposited onto a collecting surface.

As used herein, the term "microfibers" means small-diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. No. 5,213,881, entitled "A Nonwoven Web With Improved Barrier Properties".

"Crystalline polymer" refers to certain homopolymers having at least 40% crystallinity, as well as certain copolymers having at least 40% crystallinity.

"Conventional hot-melt adhesive" means a formulation that generally comprises several components. These components typically include one or more polymers to provide cohesive strength (e.g., aliphatic polyolefins such as poly (ethylene-co-propylene) copolymer; ethylene vinyl acetate copolymers; styrene-butadiene or styrene-isoprene block copolymers; etc.); a resin or analogous material (sometimes called a tackifier) to provide adhesive strength (e.g., hydrocarbons distilled from petroleum distillates; rosins and/or rosin esters; terpenes derived, for example, from wood or citrus, etc.); perhaps waxes, plasticizers or other materials to modify viscosity (i.e., flowability) (examples of such materials include, but are not limited to, mineral oil, polybutene, paraffin oils, ester oils, and the like); and/or other additives including, but not limited to, antioxidants or other stabilizers. A typical hot-melt adhesive formulation might contain from about 15 to about 35 weight percent cohesive strength polymer or polymers; from about 50 to about 65 weight percent resin or other tackifier or tackifiers; from more than zero to about 30 weight percent plasticizer or other viscosity modifier; and optionally less than about 1 weight percent stabilizer or other additive. It should be understood that other adhesive formulations comprising different weight percentages of these components are possible.

"Hot-melt processable" means that an adhesive composition may be liquefied using a hot-melt tank (i.e., a system in which the composition is heated so that it is substantially in liquid form) and transported via a pump (e.g., a gear pump or positive-displacement pump) from the tank to the point of application proximate a substrate or other material; or to another tank, system, or unit operation (e.g., a separate system, which may include an additional pump or pumps, for delivering the adhesive to the point of application). Hot-melt tanks used to substantially liquefy a hot-melt adhesive typically operate in a range from about 100 degrees Fahrenheit to about 450 degrees Fahrenheit. Generally, at the point of application, the substantially liquefied adhesive composition will pass through a nozzle or bank of nozzles, but may pass through some other mechanical element such as a slot. A hot-melt processable adhesive composition is to be contrasted with a composition that requires a conventional extruder, and the attendant pressures and temperatures characteristic of an extruder, to liquefy, mix, and/or convey the composition. While a hot-melt tank and pump in a hot-melt processing system can handle adhesive-composition viscosities in a range from about 1000 centipoise to about 50,000 centipoise, an extruder can handle and process adhesive-composition viscosities in a range from about 10,000 centipoise to viscosities of several hundred thousand centipoise. An advantage of some adhesive compositions of the present invention is that the compositions are hot-melt processable; i.e., the combination of a rubber-based adhesive and a crystalline polymer may be substantially liquefied in a hot-melt tank and conveyed to the point of application via a pump. As was stated above, however, some adhesive compositions of the present invention may not possess this particular advantage.

Unless otherwise noted, "Laminated structure" or "laminate" means a structure in which one layer, material, component, web, or substrate is adhesively bonded, at least in part, to another layer, material, component, web, or substrate. As stated elsewhere in this application, a layer, material, component, web, or substrate may be folded over and adhesively bonded to itself to form a "laminated structure" or "laminate."

"Elastic," "elastomeric," "elasticized," and "elasticity" mean that property of a material or composite by virtue of which it tends to recover its original size and shape after removal of a force causing a deformation. An elastic, or elastomeric, material or composite is one.that can be elongated by at least 25 percent of its relaxed length and will recover, upon release of the applied force, at least 10 percent of its elongation. It is generally preferred that the elastomeric material or composite be capable of being elongated by at least 100 percent, more preferably by at least 300 percent, of its relaxed length and recover, upon release of an applied force, at least 50 percent of its elongation.

"Polymer," as used herein, generally includes, but is not limited to, homopolymers, copolymers, such as, for example, block, graft, random and alternating copolymers, terpolymers, and blends and modifications thereof. As is explained in this document, polymers may assume different configurations, including isotactic, atactic, and syndiotactic configurations. "Configuration" describes those arrangements of atoms that cannot be altered except by breaking and reforming primary chemical bonds (i.e., covalent bonds). In contrast, "conformation" describes arrangements that can be altered by rotating groups of atoms around single bonds. It should be noted that a single polymer chain may be synthesized such that some portions of the chain have an isotactic configuration and some portions of the chain have an atactic configuration.

Figure 1B:
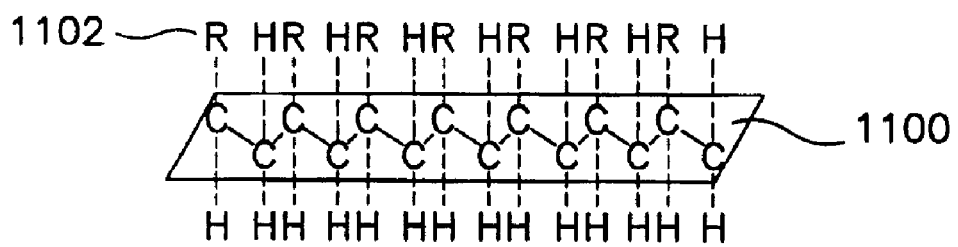
Figure 1C:
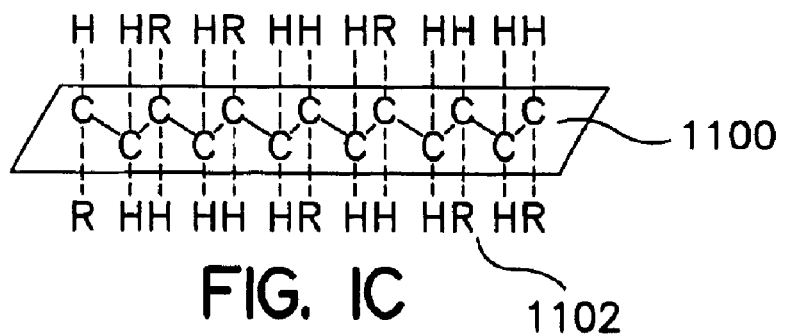

A graphic example provides additional detail on the types of configurations mentioned above. If a polymer chain is depicted in a fully-extended, planar, zigzag conformation 1100, the configuration resulting when all the substituent groups R 1102 on the polymer lie above (depicted in FIG. 1B) or below (not depicted) the plane of the main chain is called "isotactic". If substituent groups lie alternately above and below the plane the configuration is called "syndiotactic" (depicted in FIG. 1A). And a random sequence of substituents lying above and below the plane is described as an "atactic" configuration (depicted in FIG. 1C). A polymer, or a region of a polymer, having an isotactic configuration is more likely to assume characteristics of a crystalline structure. Pure isotactic polymers are rare. For purposes of this invention, the term "isotactic polymer" refers to a polymer that is at least 60% isotactic (or crystalline), suitably at least 70% isotactic, alternatively at least 80% isotactic. A polymer, or a region of a polymer, having an atactic configuration is more likely to assume characteristics of an amorphous structure. An atactic polymer may assume some crystallinity, but the degree of crystallinity is typically less than 20%, or less than 15%. For purposes of this invention, the term "atactic polymer" refers to a polymer that may not be 100% atactic, but is at least 90% atactic. Similarly, for the purposes of this invention, the term "amorphous polymer" may assume some crystallinity, but the degree of crystallinity is typically less than 20% or less than 15%. And a polymer, or a region of a polymer, having a syndiotactic configuration can assume characteristics of a crystalline structure, but to a degree less than the degree of crystallinity in an isotactic configuration.

Figure 2:
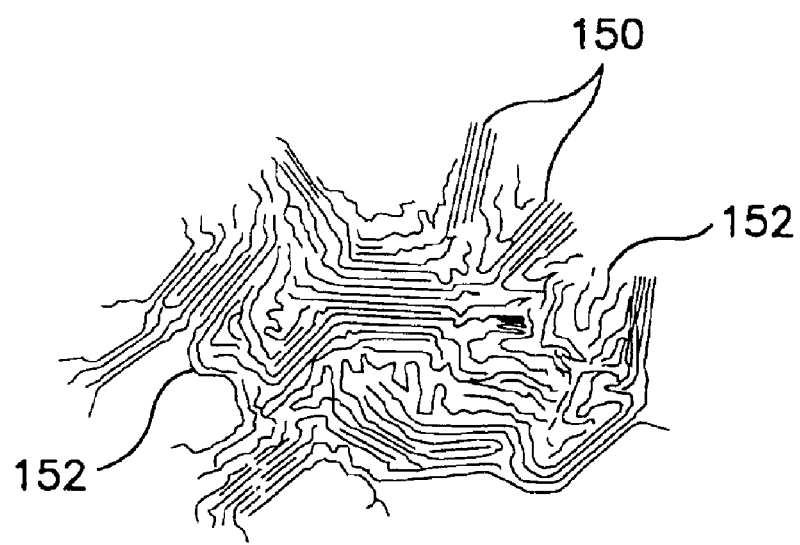
FIG. 2 gives a visual representation of a fringed-micelle model of a material having both amorphous and crystalline regions.

In this application, "fringed-micelle model" means a theoretical construct characterizing polymeric structures that have both crystalline 150 and amorphous 152 regions (one version of a graphic depiction of a fringed-micellar structure is presented in FIG. 2). This model may be used to characterize the structure of an atactic polymer and an isotactic polymer individually, i.e., each polymer possesses both crystalline regions and amorphous regions. As explained above, the isotactic polymer likely possesses a greater degree of crystallinity compared to an atactic polymer. Furthermore, this model may be used to characterize the structure of a blend of isotactic polymer and atactic polymer. It should be understood that this model provides one possible view of characteristics of the present invention and in no way limits the scope thereof.

One version of an elastic attachment adhesive composition possessing features of the present invention comprises a conventional construction adhesive, such as a rubber-based adhesive, which may include diblock, triblock, tetrablock or other multi-block elastomeric copolymers such as olefinic copolymers, including styrene-isoprene-styrene (SIS), styrene-butadiene-styrene (SBS), styrene-ethylene/propylene-styrene (SEPS), ethylene-propylene-diene-monomer (EPDM), styrene/ethylene-co-butadiene/styrene (SEBS), and/or styrene-poly(ethylene-propylene)-styrene-poly(ethylene-propylene) (SEPSEP). An example of a commercially available rubber-based construction adhesive suitable for use in the invention is NS 5610, available from National Starch and Chemical Company, Bridgewater, N.J.

The composition also includes a crystalline polymer, or isotactic polymer, having a degree of crystallinity of about 40% or more, specifically of about 60% or more, particularly of about 80% or more, and a number-average molecular weight of from about 3000 to about 200,000, more particularly of about 10,000 to about 100,000. Examples of suitable crystalline polymers include isotactic polypropylene, high density polyethylene, isotactic polystyrene, isotactic polybutene, and combinations thereof. The term "high density polyethylene" (HDPE) is used to refer to polyethylene that is essentially isotactic. HDPE generally has a density in a range of about 0.935 to 0.980 grams per cubic centimeter. An example of a commercially available crystalline polymer suitable for use in the invention is isotactic polypropylene, available from Sigma-Aldrich. The crystalline polymer may also include syndiotactic polymer, or combinations of isotactic and syndiotactic polymer.

The adhesive composition is hot-melt processable at a temperature of about 450 degrees Fahrenheit or less, specifically at a temperature of about 400 degrees Fahrenheit or less, particularly at a temperature of about 375 degrees Fahrenheit or less, and suitably at a temperature of about 350 degrees Fahrenheit or less.

Another version of an elastic attachment adhesive composition possessing features of the present invention comprises a conventional elastic attachment adhesive, such as a rubber-based adhesive, which may include diblock, triblock, tetrablock or other multi-block elastomeric copolymers such as olefinic copolymers, including styrene-isoprene-styrene (SIS), styrene-butadiene-styrene (SBS), styrene-ethylene/propylene-styrene (SEPS), ethylene-propylene-diene-monomer (EPDM), styrene/ethylene-co-butadiene/styrene (SEBS), and/or styrene-poly(ethylene-propylene)-styrene-poly(ethylene-propylene) (SEPSEP). A couple of examples of commercially available rubber-based elastic attachment adhesives suitable for use in the invention are H2525A and H2800, both available from Bostik Findley Inc., Middleton, Mass. The composition also includes a crystalline polymer, as described above. The adhesive composition is hot-melt processable at a temperature of about 450 degrees Fahrenheit or less, specifically at a temperature of about 400 degrees Fahrenheit or less, particularly at a temperature of about 375 degrees Fahrenheit or less, and suitably at a temperature of about 350 degrees Fahrenheit or less.

This adhesive composition can have a melt index between about 200 and about 2000 grams per 10 minutes, or between about 400 and about 1800 grams per 10 minutes, or between about 500 and about 1500 grams per 10 minutes, as determined using ASTM D 1238, 230° C./2.16 kg Method. The melt index is dependent upon the crystallinity, molecular weight, and the molecular weight distribution of the polymers included in the adhesive composition.

In some versions of the invention, the rubber-based construction adhesive or elastic attachment adhesive is present in an amount of about 70 to about 90 weight percent and the crystalline polymer is present in an amount of about 10 to about 30 weight percent. In another embodiment of the invention, the rubber-based adhesive is present in an amount of about 75 to about 90 weight percent and the crystalline polymer is present in an amount of about 10 to about 25 weight percent. In yet another embodiment of the invention, the rubber-based adhesive is present in an amount of about 80 to about 90 weight percent and the crystalline polymer is present in an amount of about 10 to about 20 weight percent.

For purposes of this invention, weight percent is defined as the mass of one type of polymer or sub-composition (e.g., rubber-based adhesive) in the adhesive composition divided by the sum of the masses of other types of polymer or sub-composition (e.g., rubber-based adhesive and isotactic polypropylene) in the adhesive composition, plus the mass (es) of any additional component(s) that might be present in the adhesive composition, with this value being multiplied by 100. So, for example, if we form an adhesive composition comprising 80 grams of rubber-based adhesive with 20 grams of isotactic polypropylene, the combination includes 80 weight percent rubber-based adhesive.

In another aspect, the invention encompasses elastic composite laminated structures employing embodiments of the adhesive composition as described above. For example, one version of a laminated structure of the present invention comprises a first elastic layer and a second layer that may or may not be elastomeric, wherein at least a portion of the first layer is attached to at least a portion of the second layer using an adhesive composition that is the same as, or analogous to, one or more of the embodiments described above. The adhesive composition is suitably applied to at least one of the substrates in a concentration of between about 1 gram per square meter (gsm) and about 50 gsm, or between about 5 gsm and about 20 gsm. The adhesive composition itself is stretchable, thus providing added stretchability to laminates of the invention.

Furthermore, the first layer, second layer, or both may comprise a variety of materials, including, but not limited to non-woven materials (e.g., necked-bonded laminates or spun-bond materials) and elastic components. For example, the adhesive composition can be used to bond one or more elastic strands to various non-woven substrates. The elastic strands are suitably stretchable up to 300%, or up to 500%, or up to 800%. The elastic strands can be made of any of a variety of polymers, such as polyurethane. Example of commercially available polyurethane elastic strands include LYCRA® (available from E. I. Du Pont de Nemours and Company of Wilmington, Del.) or GLOSPAN® (available from Globe Manufacturing Co. of Fall River, Mass.). Other examples of suitable elastic strand polymers include diblock, triblock, tetrablock or other multi-block elastomeric copolymers such as olefinic copolymers, including SIS, SBS, SEPS, or SEBS, which may be obtained from the Shell Chemical Company under the trade designation KRATON®.

As another example, the adhesive composition can be used to bond an elastomeric substrate, such as a non-woven elastic laminate, to a non-elastic substrate.

For example, the adhesive composition can be used to bond a necked-bonded laminate to a spunbond-meltblown-spunbond laminate, or a spunbonded layer to a spunbond-meltblown-spunbond laminate. A necked-bonded laminate ("NBL") may generally comprise a metallocene-catalyzed polyethylene layer sandwiched between two polypropylene, spunbonded layers, resulting in an elastomeric laminate that is stretchable in the cross-direction by at least 25%, suitably at least 50%. For additional detail on how NBLs and other neck-bonded materials are formed, see U.S. Pat. No. 5,336,545 to Morman, entitled "Composite Elastic Necked-Bonded Material," which is hereby incorporated by reference in its entirety in a manner consistent with the present document. A spunbond-meltblown-spunbond ("SMS") laminate may generally comprise a plurality of meltblown fibers sandwiched between two polypropylene spunbonded layers. For additional detail on how SMS laminates are formed, see U.S. Pat. No. 4,041,203 to Brock et al., which is hereby incorporated by reference.

As yet another example, the adhesive composition can be used to bond one non-woven elastic laminate to another non-woven elastic laminate, such as an NBL to an NBL, or an NBL to a stretch-bonded laminate, or an NBL to a polypropylene spunbonded layer, or a stretch-bonded laminate to a stretch-bonded laminate, or a stretch-bonded laminate to a spunbonded layer, or a spunbonded layer to a spunbonded layer. A stretch-bonded laminate ("SBL") is generally a laminate made up of an elongated elastic web or elongated elastomeric strands bonded between two spunbond layers, for example. An SBL is typically stretchable in the machine-direction by at least 50%, suitably at least 150%, or at least 300%. For additional detail on how SBLs are formed, see European Patent Application No. EP 0 217 032 published on Apr. 8, 1987 in the names of Taylor et al., which is hereby incorporated by reference in its entirety in a manner consistent with the present document. Suitably, at least one of the layers in the laminate can be stretched between about 25% and about 300%, or between about 70% and about 270%, or between about 100% and about 250%.

In general, much higher adhesion and cohesion are required for an elastic attachment adhesive to effectively bond elastic strands compared to bonding non-elastic materials. The ability of an adhesive to hold an elastic strand in place under tension can be measured by the Creep Test, described below.

For any of the laminated structures described above, the first and second layer may be part of one-and-the-same substrate. That is, the substrate may be folded over and joined to itself using an adhesive composition of the present invention.

In yet another aspect, an absorbent article may be formed that employs an adhesive composition of the present invention and/or a laminated structure of the present invention. So, for example, one version of an absorbent article of the present invention comprises a liquid-permeable topsheet; a liquid-impermeable backsheet; and a laminated structure having features of the present invention, such as one or more of the versions described above. Some or all of the backsheet may include the laminated structure; some or all of the topsheet may include the laminated structure; the laminated structure may be attached, directly or indirectly, to the backsheet, the topsheet, or both; or a laminated structure or structures may be present in some combination of these.

In addition to various versions of adhesive compositions, laminated structures, and absorbent products of the present invention, the present invention also encompasses methods of making these compositions, structures, and articles of manufacture.

One version of a method of making a laminated structure having features of the present invention comprises the steps of providing a first substrate and a second substrate, with at least one of the substrates being elastomeric. Also provided is a rubber-based adhesive and a crystalline polymer, the crystalline polymer having a degree of crystallinity of about 40% or more, specifically of about 60% or more, particularly of about 80% or more, and a number-average molecular weight of from about 3000 to about 200,000, more particularly of about 10,000 to about 100,000.

The rubber-based adhesive and the crystalline polymer are heated so that they are sufficiently liquefied for blending. The heated rubber-based adhesive and the heated crystalline polymer are blended to form an adhesive composition that is melt-processable at a temperature of less than about 450 degrees Fahrenheit, specifically of less than about 400 degrees Fahrenheit, particularly of less than about 375 degrees Fahrenheit, and suitably of less than about 350 degrees Fahrenheit. The adhesive composition is applied to the first substrate, the second substrate, or both substrates. At least a portion of the first substrate is joined to at least a portion of the second substrate so that some or all of the applied adhesive composition is positioned between the first substrate and second substrate.

In some methods of the present invention, the rubber-based adhesive is present in an amount of about 70 to about 90 weight percent and the crystalline polymer is present in an amount of about 10 to about 30 weight percent. In other methods of the invention, the rubber-based adhesive is present in an amount of about 75 to about 90 weight percent and the crystalline polymer is present in an amount of about 10 to about 25 weight percent. In still other embodiments of the invention, the rubber-based adhesive is present in an amount of about 80 to about 90 weight percent and the crystalline polymer is present in an amount of about 10 to about 20 weight percent.

It should be understood that the rubber-based adhesive and crystalline polymer could be heated and blended at a site other than the site where the laminate is being formed. For example, rubber-based adhesive and crystalline polymer could be blended using an extruder/sigma blade mixer or hot-melt processing equipment at a first geographic location. The blend could then be allowed to cool and processed to make a solid form (e.g., block or brick). The blend of rubber-based adhesive and crystalline polymer, in solid form, could then be shipped from the first geographic site to a site where a laminate is to be made. The blend, in solid form, would simply be heated to substantially liquefy the adhesive composition prior to its being used to make a laminate.

It should also be understood that a method having features of the present invention encompasses different sequences of steps by which the elastic attachment adhesive composition is made. For example, the rubber-based adhesive could be heated in a first container. The crystalline polymer could be heated in a second container, before, after, or concurrently with the heating of the rubber-based adhesive. Then, the two substantially liquefied compositions could be blended in the first container, the second container, or a third container. Alternatively, the rubber-based adhesive could be heated in a container, and after the adhesive is substantially liquefied, the crystalline polymer could be added to the same container to be heated and blended. In another alternative, the crystalline polymer could be heated in a container, and after the polymer is substantially liquefied, the rubber-based adhesive could be added to the same container to be heated and blended. In yet another alternative, the rubber-based adhesive and crystalline polymer could be added to the same container to be heated and blended at the same time.

In other words, our invention contemplates various methods and sequences by which selected amounts of rubber-based adhesive and crystalline polymer (plus any other optional additives) are heated and blended to form an elastic attachment adhesive composition of the present invention.

The preceding discussion assumes that the rubber-based adhesive and crystalline polymer are in substantially solid form at room temperature, or temperatures that are typically present in a working environment suitable for human beings. To the extent that the rubber-based adhesive or crystalline polymer is available in substantially liquid form, then those steps providing for heating and liquefying that material (i.e., the already-liquefied material) can be omitted from methods of the present invention.

One version of a method in which an elastic attachment adhesive composition of the present invention is metered or delivered at a desired rate to a unit operation (e.g., a unit operation where the adhesive composition is applied to a substrate or substrates in order to make a laminate) comprises the steps of: determining the amount of adhesive composition being used by the unit operation per unit time; and force-adjusting the volumetric flow rate or the mass flow rate of the adhesive composition so that the amount of adhesive composition being metered or delivered to the unit operation corresponds to the amount of adhesive composition being used by the unit operation per unit time.

In the process description that follows, the preparation, processing, and application of an elastic attachment adhesive composition including rubber-based adhesive and crystalline polymer is described. It should be understood, however, that this description is given as an example. Other processing methods and equipment may be used to prepare and deliver various adhesive compositions of the present invention.

Figure 3:
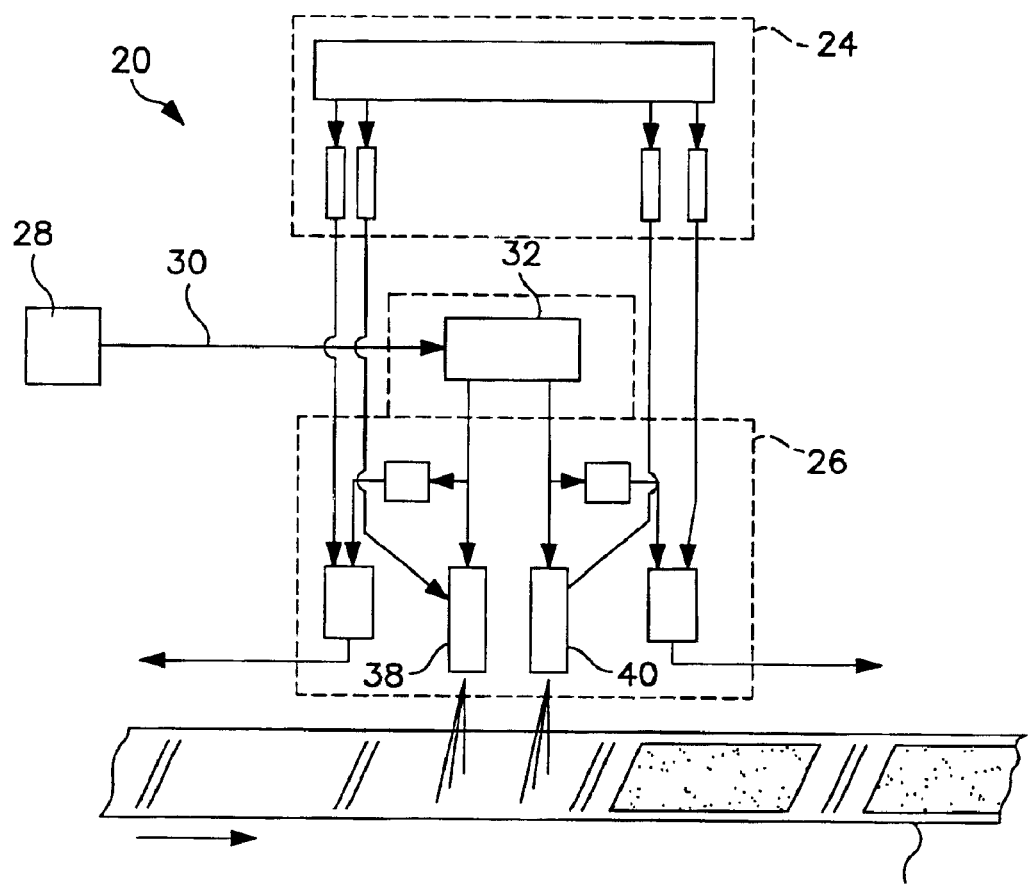
FIG. 3 shows a schematic diagram of one version of a method and apparatus for preparing, processing, and delivering an adhesive composition.

FIG. 3 shows a schematic diagram of an apparatus 20, and a method for spraying an adhesive composition, on a moving web 22. The apparatus 20 may include a programmable control system 24 that is operatively connected to a flow-control system 26. The combination of the programmable control system 24 and the flow-control system 26 are configured to control the delivery of an adhesive composition in liquid form to the moving web 22.

Generally an adhesive composition is received in solid form at a manufacturing site where equipment such as that depicted in FIG. 3 is located. For example, hot-melt adhesive compositions may be received as solid pellets, blocks, or some other shape. The solid is then heated so that the hot-melt adhesive composition is in a form such that it can be conveyed, and applied, to a substrate or other material. Usually this requires that the heated hot-melt adhesive be in substantially liquid form. For the present invention, an adhesive composition comprising a rubber-based adhesive and crystalline polymer, in solid form, might be received at a manufacturing site for heating and processing as described above. Alternatively, the rubber-based adhesive and crystalline polymer might be received as separate components to be blended at the manufacturing site. As discussed above, the present invention encompasses a variety of sequences of steps for making adhesive compositions of the present invention. An example of equipment and methods for heating an adhesive composition, or precursor materials to the adhesive composition, are described in more detail below.

The apparatus may also include a position-sensing system that is configured to sense a position of the moving web 22 and, in response thereto, generate a signal that is sent to the programmable control system 24.

As representatively illustrated in FIG. 3, the continuously moving web 22 may be supplied by any means known to those skilled in the art, such as known conveyor systems. The continuously moving web 22 can include any type of layer or web of material, such as films, nonwoven webs, woven webs which may include strands of thermoplastic material, elastomeric components, natural material such as threads of cotton and the like, laminate materials, or combinations thereof. More particularly, the continuously moving web 22 may include a necked-bonded laminate ("NBL"), which generally comprises a polyethylene layer sandwiched between two polypropylene, spunbonded layers; a polypropylene, spunbonded layer; or an outercover comprising a polyethylene layer and a polypropylene, spunbonded layer.

As is described below in more specific terms, the adhesive is sprayed on the continuously moving web 22 in a specific design or pattern for subsequent placement of or bonding to another material. The other material can be the same or different than the web to which adhesive was applied, as long as at least one of the substrates is elastomeric. In some cases adhesive might be applied to both substrates before they are joined together. And, as mentioned above, one substrate might be folded over and attached to itself to form a laminated structure.

The programmable control system 24 of the present invention is configured to send signals to the flow control system 26 which, in response thereto, is configured to initiate a spray of adhesive at the correct time to provide the desired pattern of adhesive on the moving web 22. As representatively illustrated in FIG. 3, the flow control system 26 includes an adhesive source 28 which is configured to deliver an adhesive through an adhesive supply line 30 to a metering mechanism 32. The adhesive can be delivered to the metering mechanism 32 by any means known to those skilled in the art, such as by the use of a pump.

The metering mechanism 32 is configured to continuously supply at least one independent, volumetric flow of adhesive to a respective nozzle. As used herein, the term "volumetric flow" refers to a flow of adhesive that has a predetermined volumetric flow rate. Such a "volumetric flow" may be provided by a positive-displacement metering pump which is configured to supply a specific volumetric flow which is independent of the manner in which the adhesive is supplied to the metering mechanism 32. As a result, for an adhesive that is at a given density, the metering mechanism 32 is configured to provide an independent, predetermined mass flow rate of adhesive to each nozzle. Other adhesive processing and delivery systems utilize pressure to provide a flow of adhesive.

The metering mechanism 32 of the present invention may be configured to supply a single, volumetric flow of adhesive to one nozzle or an independent, volumetric flow of adhesive to each of a plurality of nozzles depending upon the number of nozzles required to provide the desired pattern of adhesive on the moving web 22. A suitable device to provide the metering mechanism 32 may include a positive-displacement metering pump which is commercially available from May Coating Technologies, Acumeter Division, a business having offices located in Holliston, Mass., under the trade designation No. 19539. The metering mechanism 32 may include any other piston pump or gear pump which are well known to those skilled in the art.

The metering mechanism 32 may be configured to supply any desired volumetric flow rate of adhesive to each nozzle. For example, the metering mechanism 32 may be configured to provide a pre-determined volumetric flow rate of from about 1 to about 1000 cubic centimeters per minute and suitably from about 30 to about 180 cubic centimeters of adhesive per minute to each nozzle. The metering mechanism 32 may be configured to provide either a constant or a variable volumetric flow rate of adhesive to each nozzle. For example, if the metering mechanism 32 is a positive-displacement metering pump, the speed of the pump may be controlled to vary the volumetric flow rate of adhesive to the nozzles.

Each nozzle 38 and 40 as representatively illustrated in FIG. 3 can be any device which is capable of providing the desired pattern of adhesive on the moving web 22. For example, one suitable nozzle is commercially available from Nordson Corporation, a business having offices located in Duluth, Ga., under the trade designation Model No. 144906. Another suitable nozzle for use in the present invention is obtainable from ITW Dynatec Co. of Hendersonville, Tenn., under the trade designation number 057B1639, 1.D. #A3. Such nozzles are typically configured to be operated between an on position and an off position to control the spray of adhesive from the nozzles. When operated in the on position, each nozzle may be configured to spray substantially the entire volumetric flow of adhesive which is independently supplied to it to more accurately control the amount and pattern of the adhesive on the moving web. The nozzles 38 and 40 may further be configured to include air streams that can be directed to provide a desired pattern in the spray of adhesive being dispensed from each nozzle. Such air streams can provide a desired adhesive spray pattern, such as a pattern of swirls of adhesive. The adhesive can be applied to the moving web 22 in a concentration of between about 1 gram per square meter (gsm) and about 50 gsm, or between about 5 gsm and about 20 gsm.

After the pattern of adhesive has been sprayed on the moving web 22, the web may be further processed in a variety of ways. For example, the continuously moving web 22 may be contacted by a second substrate web, such as a nonwoven layer, between a pair of nip rolls to adhesively join the two substrate webs together. Thereafter, this composite material or laminate may be used in a variety of ways such as in the construction of disposable absorbent articles such as diapers, incontinent articles, training pants, feminine care articles and the like.

The above discussion provides one example of hot-melt processing equipment 15 and a system for applying adhesive to a substrate. It should be understood that this is but one example, and that the present invention encompasses other systems for preparing and applying adhesives (see, e.g., U.S. Pat. No. 4,949,668, entitled "Apparatus for Sprayed Adhesive Diaper Construction," which issued on Aug. 21, 1990, and which is hereby incorporated by reference in its entirety and in a manner consistent with the present document).

Regardless of the system used to apply the adhesive, the resulting composite material or laminate may be exposed to thermal, infrared, ultrasonic, or other forms of energy in subsequent unit operations or processing steps. For example, the laminate or composite material may pass through an ultrasonic-bonding unit operation wherein the laminate or composite material are exposed to ultrasonic energy. After exemplary composite materials or laminates such as those referred to above are formed using an adhesive composition of the present invention, some or all of the composite or laminate may be exposed to ultrasonic energy. Referring to PCT International Publication Number WO 99/25296, which is hereby incorporated by reference in its entirety in a manner consistent with the present document, the publication discloses the use of ultrasonic bonding to form side seams or seals in the disposable underpant. (See, e.g., page 29, lines 10–25; additional detail regarding the forming of such side seals is disclosed in U.S. Pat. No. 4,610,681, which issued on Sep. 9, 1986 and is entitled "Disposable Underpants Having Discrete Outer Seals," and which is hereby incorporated by reference in a manner consistent herewith; and U.S. Pat. No. 4,641,381, which issued on Feb. 10, 1997 and is entitled "Disposable Underpants, Such as Infant's Training Pants and the Like," which is also incorporated by reference in a manner consistent with the present document.)

Thus, adhesives of the present invention, used to make laminates and composite materials, may be exposed to ultrasonic energy when ultrasonic-bonding equipment is used in subsequent processing steps (e.g., when the ultrasonic bonding equipment is used to form the seams or seals in the disposable absorbent article as discussed above).

Specific examples of composite materials, laminates, and disposable absorbent articles with which adhesives of the present invention may be utilized are disclosed in the following U.S. Patents and U.S. Patent Applications: U.S. Pat. No. 4,798,603 issued Jan. 17, 1989, to Meyer et al.; U.S. Pat. No. 5,176,668 issued Jan. 5, 1993, to Bernardin; U.S. Pat. No. 5,176,672 issued Jan. 5, 1993, to Bruemmer et a.l.; U.S. Pat. No. 5,192,606 issued Mar. 9, 1993, to Proxmire et aL; U.S. Pat. No. 4,940,464, entitled "Disposable Incontinence Garment or Training Pant"; U.S. Pat. No. 5,904,675, entitled "Absorbent Article With Improved Elastic Margins and Containment System"; U.S. Pat. No. 5,904,672, entitled "Absorbent Article Having Improved Waist Region Dryness and Method of Manufacture"; and U.S. Pat. No. 5,902,297, entitled "Absorbent Article Having a Collection Conduit." Each of the preceding U.S. patents is incorporated by reference in its entirety and in a manner consistent with the present document. More specifically, the types of absorbent articles in which the adhesives of the present invention may be used include diapers, children's training pants, swim wear, incontinence products, feminine care products, other personal care or health care garments, including medical garments, or the like. It should be understood that the present invention is applicable to other structures, composites, or products incorporating adhesive compositions of the present invention.

Additional Detail on Representative Process-control Embodiments

Figure 4A:
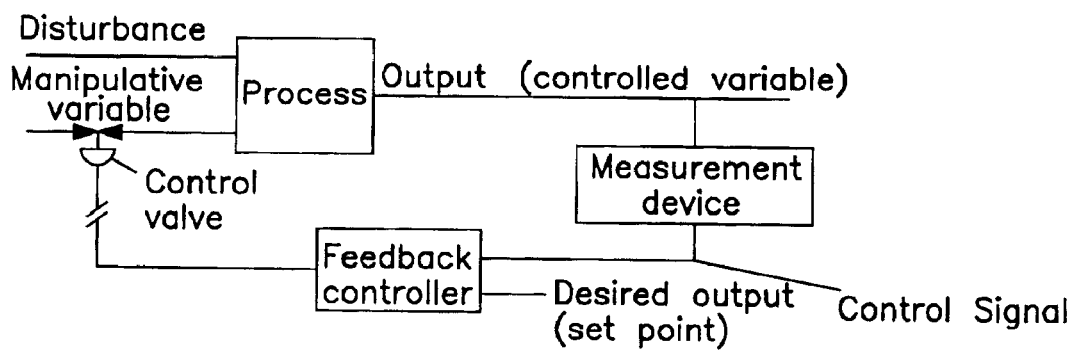
FIG. 4A shows one version of a feedback control scheme.
Figure 4B:
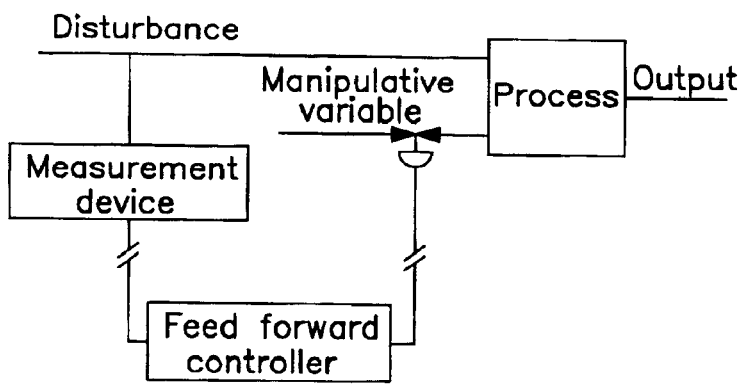
FIG. 4B shows one version of a feedforward control scheme.

As discussed above, process-control systems may be used to control the volumetric or mass flow rate of adhesive compositions of the present invention to a point of application (e.g., to a point of application on a substrate, layer, or web that will be used to make a laminate or composite material). Persons of ordinary skill in the art of process control are familiar with the various process-control strategies, algorithms, and equipment used to control a process. Some of the possible strategies that may be used to control a process include feedback-control strategies (i.e., a process in which a variable to be controlled is measured, the measured value is compared to a desired value, and the difference between the measured value and the desired value is transmitted to a feedback controller that force adjusts a manipulative variable to drive the measured variable back to the desired value) (see, e.g., FIG. 4A); feedforward-control strategies (i.e., a process in which a disturbance entering a process is detected, and an appropriate change is made to a manipulative variable so that an output variable is held constant; see, e.g., FIG. 4B); and the like.

Figure 5:
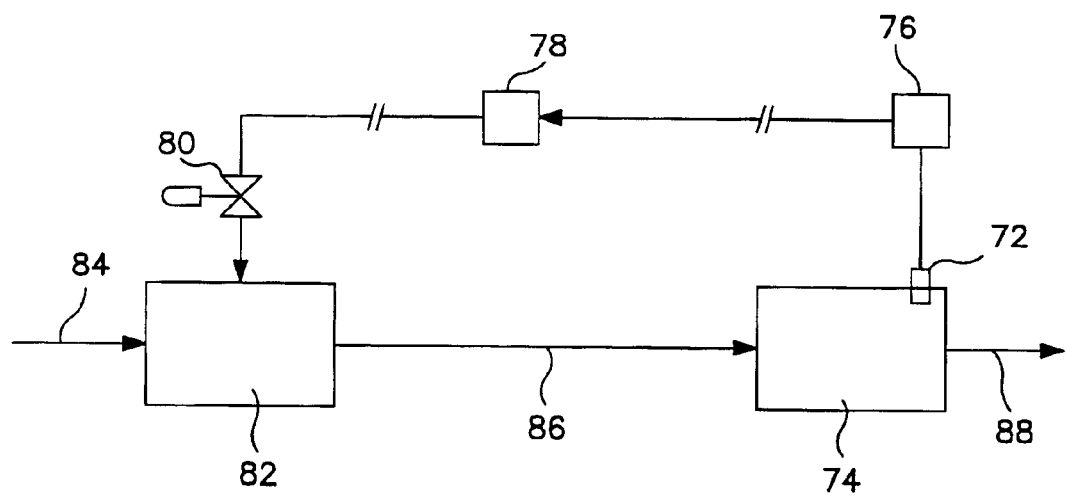
FIG. 5 shows one version of a process control system.

One example of a process-control system is depicted in FIG. 5. A sensor may be used to determine a signal $S_1$ corresponding to the variable to be controlled, e.g. the volumetric or mass flow rate of adhesive being sprayed or delivered in an adhesive-application unit operation 74. This signal may then be relayed electrically, pneumatically, hydraulically, or by other means to a transmitter 76, which converts the signal $S_1$ into a control signal $M_1$. The transmitter transmits the control signal $M_1$ to the controller 78.

After receiving the control signal $M_1$, the controller sends the corresponding output signal $R_1$ to the control element 80. The control element, such as an electronic or pneumatic control valve, responds to the output signal $R_1$ by opening or closing, thus effecting the desired change to the variable being manipulated, in this case the volumetric or mass flow rate of adhesive. Alternatively, the control element might effect a desired change to the speed at which a pump operates, thereby controlling the mass or volumetric flow rate of adhesive.

As mentioned above, an air-pressure, electrical, pneumatic, or other signal may be used to transmit information (e.g., the various signals discussed in the preceding paragraphs) from one device to another (e.g., from a sensor, to a transmitter, to a controller, to a control element, or to some combination of some or all of these). For example, the controller may be a device that converts a control signal into an equivalent air-pressure, electrical, pneumatic, or other output signal. This air-pressure, electrical, pneumatic or other output signal is sent from the controller to a control element that effects a change to the variable being manipulated. If the output signal is an air-pressure signal, the output signal will be transmitted to the control element via tubing. The control element, such as a pneumatic control valve, responds to the output signal by opening or closing, thus effecting the desired change to the variable being manipulated. The control system may include multiple valves: e.g., a two-valve system with one operating as a one-directional, open-or-shut valve and the other operating as a proportional valve. Alternatively, the output signal is converted into an electrical signal. The output signal is relayed to the control element via metal wire or other electrical conductor. The control element, such as an electronic control valve, responds to the electrical signal by opening or closing, thus effecting the desired change to the variable being manipulated.

An operator may input a value directly to the controller to produce a control signal. For example, an operator may adjust a dial or other input device on a pneumatic, hydraulic, electronic, or other controller to adjust the volumetric or mass flow rate of adhesive. The operator selects a setting on the input device of the controller corresponding to the flow rate desired by the operator. Typically the operator will have calibrated the input device on the controller so that input-device settings each correspond to specific volumetric or mass flow rate values.

A general-purpose computer may be used in place of, or in addition to, the controller mentioned above. Typically a general-purpose computer employs an input device, including, but not limited to, an alpha-numeric keyboard, mouse, joystick, stylus, touch screen, or some combination of these. Other devices which may be used to input data to the computer include, but are not limited to: devices for reading data stored on magnetic media such as 3.5 inch "floppy disks" or fixed-drives; devices for reading data stored on optical media, such as CD-ROMs; devices for reading data transmitted over cables, including optical cables; and devices for scanning and digitizing information on a document. In addition to the input devices like those mentioned above, a general-purpose computer usually includes a visual display for displaying data. Also, a general-purpose computer typically has a device for storing and retrieving data that is inputted to the computer. Devices for storing and retrieving data include, but are not limited to: a disk drive for reading data from, and storing data on, a 3.5 inch "floppy disk"; a hard disk or other fixed drive; a tape drive; or other device capable of reading data from, and storing data on, magnetic media.

A general-purpose computer may be adapted for use in controlling the volumetric or mass flow rate of adhesive. Typically a general-purpose computer comprises devices for data input, data storage, data processing, data display, and data output, as discussed above. For purposes of controlling volumetric or mass flow rate, the general-purpose computer may further comprise a set of instructions comprising the following steps: reading the control signal $M_1$, the control signal $M_1$ being transmitted to the computer in computer-readable form; correlating the control signal $M_1$ to an output signal $R_1$ and transmitting the output signal $R_1$ to a control element. The control element, such as an electronic, hydraulic, pneumatic, or other control valve, responds to the output signal $R_1$ by opening or closing, thus effecting the desired change to the variable being manipulated, in this volumetric or mass flow rate. Alternatively, the control element may effect desired changes to the speed at which a positive-displacement or other metering pump operates, thereby effecting desired changes to mass or volumetric flow rates.

The above discussion provides exemplars of equipment and methods for controlling the amount of adhesive being conducted to a point of application per unit time. It should be understood that other equipment and methods used to force adjust the flow rate of an adhesive of the present invention to a control set point, operator-inputted value, or other desired value falls within the scope of the present invention.

Tests/Procedures

Laminate Production

Figure 6:
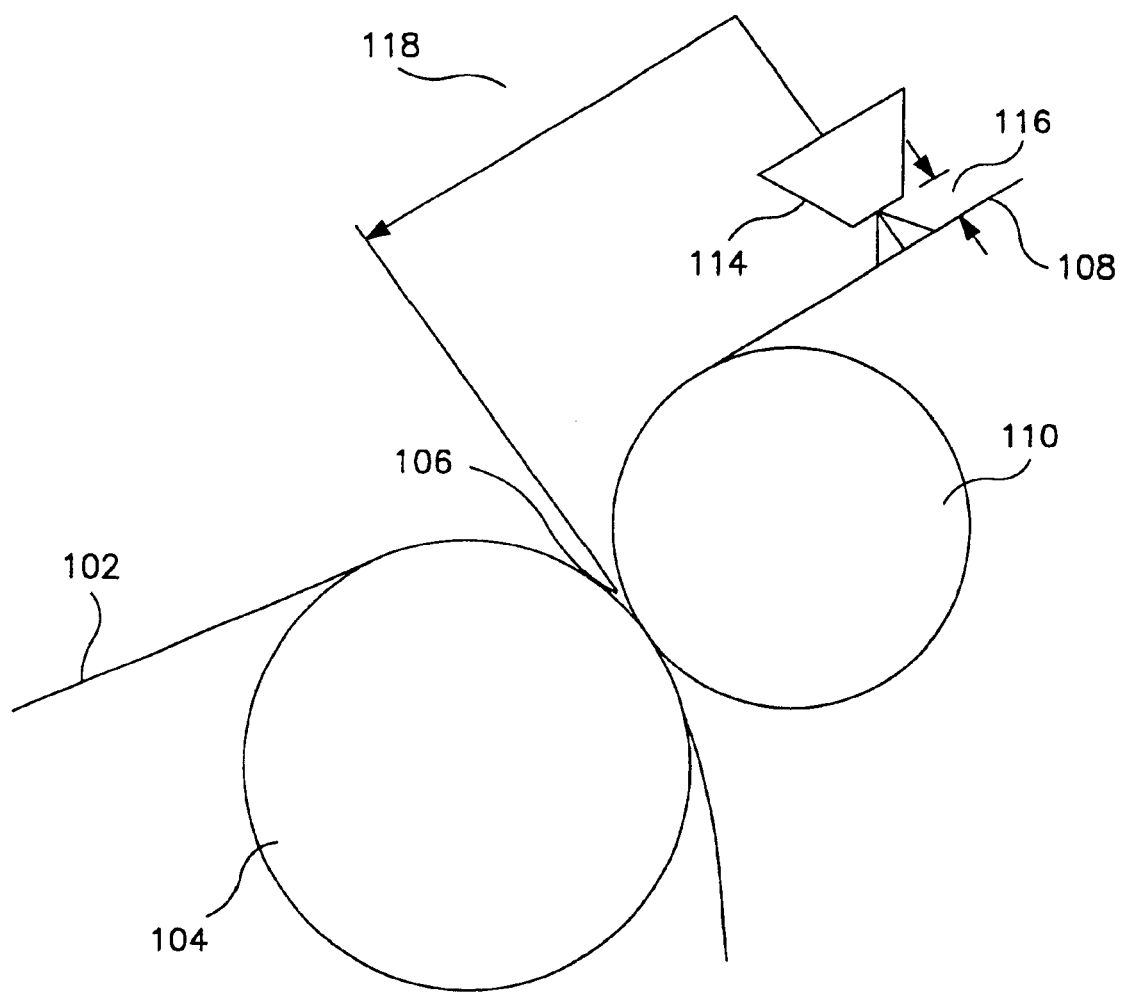
FIG. 6 shows one version of a process for making a laminate comprising an adhesive composition.

Laminates were made on equipment available from J & M Laboratories, a business having offices located in Dawsonville, Ga. As depicted in FIG. 6, a first substrate or first base material 102, such as a nonwoven web, was directed from its corresponding unwind stand (not shown) to the surface of a 6-inch-diameter steel roll 104 and through a nip 106 between the steel roll and a 4-inch-diameter rubber roll 110. A second substrate or second base material, such as a second nonwoven web 108, was directed from its unwind stand (not shown) to the surface of the rubber roll and through the nip. Typically, the equipment was operated at a speed of 300 feet per minute.

The applicator 114 used to deposit the adhesive was positioned so that the face of the depicted nozzle, which was roughly parallel to the surface of the web to which adhesive was first applied, was 1.5 inches 116 from the surface of the web. Furthermore, the central axis of the depicted nozzle, which is perpendicular to the web to which adhesive is first applied, was 8 inches 118 from a parallel axis that passes through the nip defined by the rubber and steel rolls.

Figure 7A:
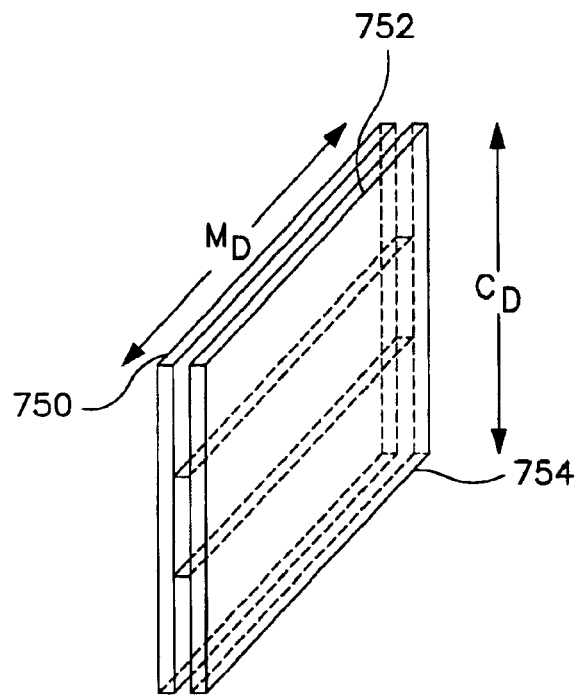
FIG. 7A shows a top view of a portion of one version of a laminate.
Figure 7B:
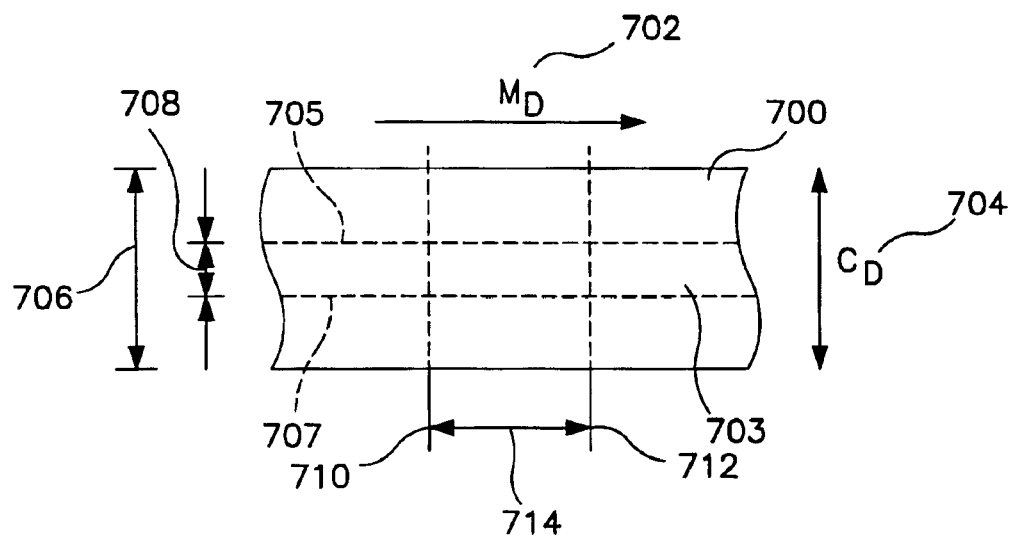
FIG. 7B shows a sectional, perspective view of a test panel cut from one version of a laminate.

From the discussion above, it should be understood that the substrates and the resulting laminate 700 generally moved in a machine direction 702 (see FIG. 7A) during their preparation. FIG. 7A depicts a top view of a portion of a laminate after it has been formed. A continuous band of adhesive 703, whether it was applied using meltblowing, cycloidal, slot, or other application technique, is denoted by broken lines 705 and 707. The adhesive is under the upper substrate of the laminate depicted in the Figure. As the laminate is made in a continuous manner, it is wound up in the form of a roll. The direction that is perpendicular to the machine direction, but lying within the plane of the laminate, is denoted as the cross-machine direction 704. Typically the width of the formed laminate, width denoting the dimension parallel to the cross-machine direction, was about 4 inches 706. The width of the applied adhesive, again width denoting a dimension parallel to the cross-machine direction, typically was from about 0.5 inches to about 2 inches 708. Also, the band of adhesive was generally applied such that it was substantially centered in the laminate (in the width dimension). Unless otherwise noted, the width of the applied adhesive was about 1.0 inch. (Note: the lines 710 and 712 denote the manner in which a 2-inch 714 sample was cut for subsequent analysis; sample preparation and orientation is discussed in more detail below).

The selected adhesive was either an adhesive of the present invention (as noted in the Examples below), or a hot-melt adhesive (again as noted in the Examples below). The adhesive was added using a variety of patterns, including a meltblown pattern, a swirl or cycloidal pattern, or a pattern resulting from slot coating. Typically the adhesives were heated to temperatures ranging from about 350 degrees Fahrenheit to about 380 degrees Fahrenheit prior to application to one of the substrates. Unless otherwise noted, the selected adhesive was added using a meltblown pattern. As stated above, unless otherwise noted the width of the added adhesive was about 1.0 inch. The selected adhesive was added in amounts varying from about 5 grams per square meter to about 30 grams per square meter, with specific application levels or add-on levels noted in the examples.

A number of different substrates were used to prepare the laminates, as noted in the Examples below. The substrates that were used included: a necked-bonded laminate ("NBL"), which generally comprised a polyethylene layer sandwiched between two polypropylene, spunbonded layers; a polypropylene, spunbonded layer ("SB"); and an outercover ("OC") comprising a polyethylene layer and a polypropylene, spunbonded layer. For tests where the performance of a laminate of the present invention was compared to the performance of a laminate prepared using a conventional hot-melt adhesive, the same substrates were used to prepare both the laminate of the present invention and the conventional laminate.

Molecular Weight (Number Average and Weight Average)

A crystalline polypropylene was sent to American Polymer Standard Corp., a business having offices in Philadelphia, Pa., for molecular-weight determinations. The number-average and/or weight-average molecular weights were determined by American Polymer using gel-permeation chromatography on a Waters Model No. 150 gel-permeation chromatograph. The determinations were made using: four, linear, Shodex GPC gel columns; poly(styrene-divinyl benzene) copolymers as standards; trichlorobenzene as the solvent, introduced to the chromatograph at a volumetric flow rate of 1.0 milliliter per minute; an operating temperature of 135 degrees Celsius; a sample-injection volume of 100 microliters; an M-150C-(64/25) detector; and a GPC PRO 3.13 IBM AT data module.

Thermal Aging Process

A 200-gram sample of each hot melt adhesive was put in a 1 pint Mason jar and covered with aluminum foil and sealed. The jar was then placed in an oven at 350° Fahrenheit for 72 hours (for construction adhesives) or 96 hours (for elastic attachment adhesives).

Creeping Resistance of Elastic Strands

Figure 8:
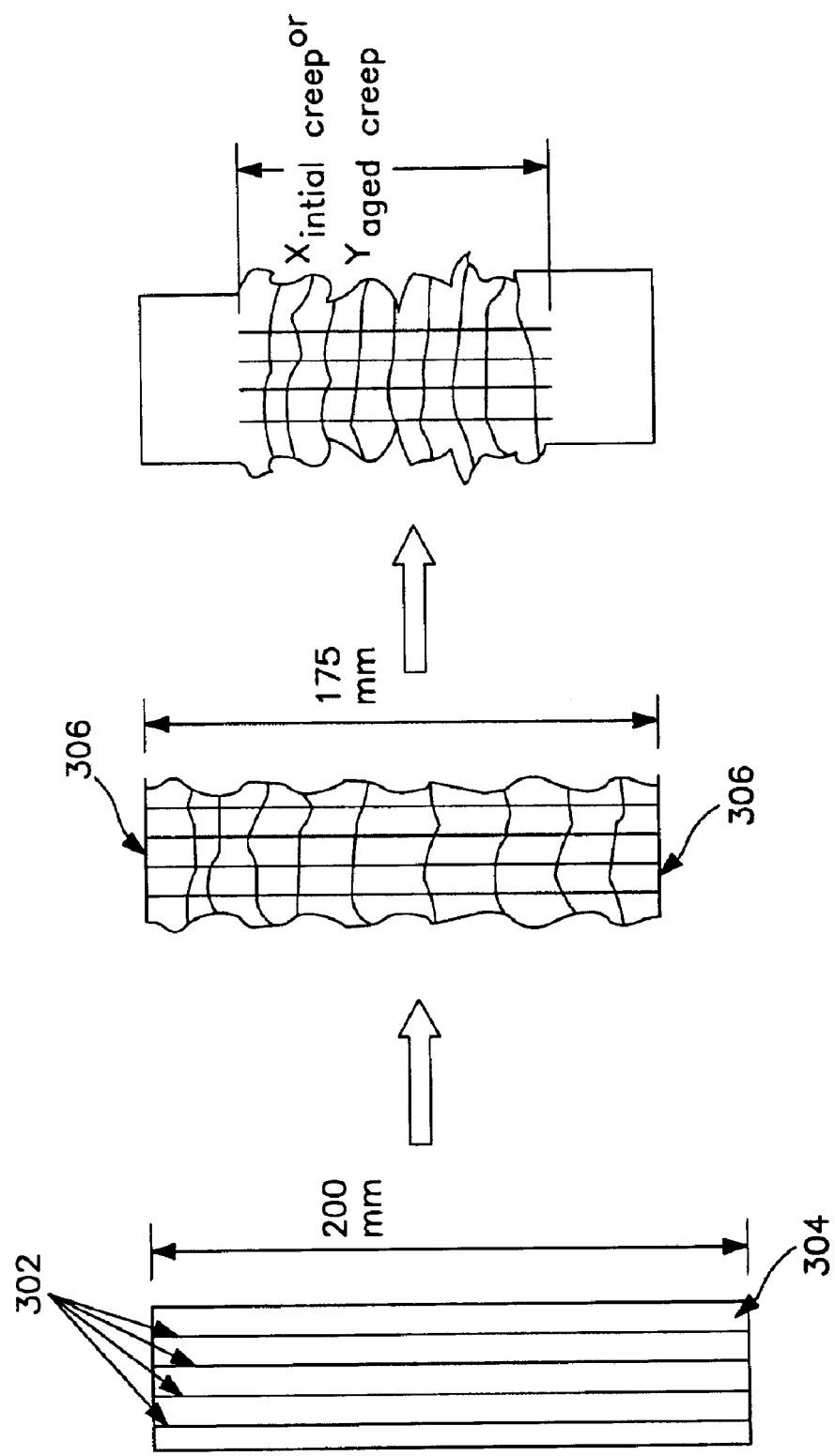
FIG. 8 shows a schematic diagram of creep testing.

Twelve elastic strands 302, approximately 2.5 mm apart in the cross-direction and each elongated approximately 200%, 250%, or 300%, were adhesively attached and sandwiched between two 4-inch wide continuous polypropylene spunbonded layers 304 to form a laminate. The laminate was fully extended by hanging a weight (about 500 grams or higher) at one end of the laminate, and a 200 mm machine-direction length was then marked. The laminate was then released, such that the 200 mm length snapped back to 175 mm, whereupon the 175 mm length was marked. The laminate was then stapled to a piece of cardboard at the 175 mm length. The marked length of the laminate was then cut to release tension in the elastic strands 302, and the snapback length of the strands was measured. An illustration of the creeping test procedure is shown in FIG. 8.

Initial creep percentage was calculated by first determining the impact of percentage elongation in terms of an elongation factor, $L_0$, as shown in the following equation:

$$L_0 = (\% \text{ elongation} \times 100)/(\% \text{ elongation} + 100)$$

Initial creep percentage was then calculated by determining the difference between the 175 mm length and the snapback length, $X_{initial\ creep}$, then dividing the difference by the 175 mm length, corrected by the elongation factor, $L_0$, and multiplying the quotient by 100, as shown in the following equation:

$$\text{Initial Creep } \% = (175_{mm} - X_{initial\ creep})/(175 - L_0) \times 100\%$$

The sample was then placed in an oven at 100° Fahrenheit for 90 minutes to measure aging creep. Aging creep percentage was then calculated by determining the difference between the 175 mm length and that snapback length, $Y_{aged\ creep}$, then dividing the difference by the 175 mm length, corrected by the elongation factor, $L_0$, and multiplying the quotient by 100, as shown in the following equation:

$$\text{Aging Creep } \% = (175_{mm} - Y_{aged\ creep})/(175_{mm} - L_0) \times 100\%$$

$X_{initial\ creep}$ and $Y_{aged\ creep}$ readings were taken from the averaged measurements of the 24 strands during the tests.

Accretion Value or Relative Accretion Value

The relative accretion or build-up of an adhesive, alone or in combination with other materials, e.g., fibers, was measured by running a laminate comprising adhesive through a rotary ultrasonic bonder at 300 feet per minute for ten minutes (or other specified time). The rotary bonder included a horn and a dot-pattern anvil design. The ultrasonic generator was a 3005 Autotrac, 20 KHz, 3000 watt generator from Dukane Corporation, a business having offices in Saint Charles, Ill. A variable-power supply was used to vary power available to the generator. The power level used was 100%, which corresponded to an ultrasonic wave amplitude of 2.8 to 3.5 mil (1 mil is equivalent to 1/1000 inch). The horn diameter was approximately 6.75 inches, with the pressure exerted by the horn on the anvil typically about 40 pounds per square inch or more to ensure good contact between the substrate, web, or laminate being processed; the horn; and the anvil.

The anvil had a dot pattern, with each pin having a 45 mil diameter and a height of 31 mil. The spacing between each pin was about 79 mil. The anvil pins were made from D2 tool steel, which was heat treated and through hardened to Rockell C 60–63. The width of the pattern was 300 mil. The diameter of the anvil was about 5.7 inches.

Additional detail on related designs and specifications pertaining to ultrasonic equipment is found in U.S. Pat. Nos.

5,110,403 and 5,096,532, both of which are incorporated by reference in a manner consistent with the present application.

The build-up, which consisted of adhesive and other material, e.g., nonwoven fibers, was scraped from the horn and the anvil and weighed, giving the accretion value for the evaluated adhesive.

Laminates for this evaluation were prepared by meltblowing adhesive to get a 10 gram per square meter coverage on an approximately 0.4-ounce-per-square-yard polypropylene spunbond nonwoven facing. As shown above, adhesive was applied to one facing. This facing with the applied adhesive was then nipped together with the other facing (or substrate, in this case another 0.4 osy polypropylene spunbond substrate) to form a laminate. Typical lamination speeds were 300 feet per minute.

Conventional hot-melt adhesives that were used to prepare laminates prior to accretion-value tests included: an adhesive available under the designator H2800 from Bostik-Findley, a business having offices in Milwaukee, Wis.; an adhesive available under the designator H2525A from Bostik-Findley; and an adhesive available under the designator N.S. 10242-94A from National Starch Co., a business having offices in Bridgewater, N.J.

A laminate made using a conventional hot-melt adhesive, or an adhesive of the present invention, was run through ultrasonic-bonding equipment under the conditions described above. The accretion or buildup was scraped off the various ultrasonic-bonding surfaces after a selected time and weighed. Relative-accretion values may be calculated by dividing the accretion value of the laminate comprising an adhesive of the present invention by the accretion value of a selected conventional hot-melt adhesive (e.g., a conventional hot-melt adhesive for which an adhesive of the present invention is to be substituted).

EXAMPLES

Example 1

The ability of the elastic attachment adhesives of the invention to hold an elastic strand in place under tension (200–300% elongation) was measured by the Creep Resistance Test, described above. More particularly, the creeping of a blend of 86% NS 5610 and 14% isotactic polypropylene ("I-PP") was compared to the creeping of NS 5610 alone; the creeping of a blend of 82% H2525A and 18% I-PP was compared to the creeping of H2525A alone; and the creeping of a blend of 85% H2800 and 15% I-PP was compared to the creeping of H2525A alone.

Each of the adhesive compositions tested in this example were tested with an elastic strand of LYCRA® 940 (available from E. I. Du Pont de Nemours and Company of Wilmington, Del.) laminated between two polypropylene spunbonded layers, with the adhesive applied with an ITW application at 7.5 grams per square meter (gsm). Each of the adhesive compositions tested in this example were also tested with an elastic strand of GLOSPAN® 1120 (available from Globe Manufacturing Co. of Fall River, Mass.) laminated between two polypropylene spunbonded layers, with the adhesive applied with an ITW application at 7.5 gsm.

Table 1, below, shows the test creeping results of each of the adhesives tested. The testing was carried out at 200% elongation. The Aging Creeping was performed after aging the samples at 100° Fahrenheit for 90 minutes.

TABLE 1

Creeping Resistance Test Data

| Adhesive | Elastic Strand | Aging Creeping |
|---|---|---|
| NS-5610 | LYCRA ® 940 | 90% |
| NS-5610 | GLOSPAN ® 1120 | 85.2% |
| 86% NS-5610/14% I-PP | LYCRA ® 940 | 37% |
| 86% NS-5610/14% I-PP | GLOSPAN ® 1120 | 56.5% |
| H2525A | LYCRA ® 940 | 41.7% |
| H2525A | GLOSPAN ® 1120 | 69.4% |
| 82% H2525A/18% I-PP | LYCRA ® 940 | 18.5% |
| 82% H2525A/18% I-PP | GLOSPAN ® 1120 | 27.8% |
| H2800 | LYCRA ® 940 | 15% |
| H2800 | GLOSPAN ® 1120 | 17.6% |
| 85% H2800/15% I-PP | LYCRA ® 940 | 9.3% |
| 85% H2800/15% I-PP | GLOSPAN ® 1120 | 11.1% |

As can be seen in Table 1, the bond strength, as measured by percentage aging creep, for elastic strands using a blend of NS 5610 and I-PP is slightly better than that of the conventional elastic attachment adhesive H2525A. Furthermore, the blend of H2525A and I-PP showed much better creeping resistance than that of H2525A alone. Similarly, the blend of H2800 and I-PP showed some increased bond strength relative to H2800 alone.

Example 2

Creep resistance of H2525A applied to LYCRA® 940 with an ITW application was tested in Example 1, with a resulting aging creeping of 41.7%, as shown in Table 1. In this Example, the same test was performed on a sample of H2525A melt-blown onto LYCRA®940, and also on a sample of H2525A applied to LYCRA® 940 in a swirl application, both at an add-on of 7.5 gsm. Results of these tests, in comparison to the ITW application, are shown in Table 2, below.

TABLE 2

Creeping Resistance Test Data

| Adhesive | Elastic Strand | Application | Aging Creeping |
|---|---|---|---|
| H2525A | LYCRA ® 940 | ITW | 41.7% |
| H2525A | LYCRA ® 940 | meltblown | 37% |
| H2525A | LYCRA ® 940 | swirl | 80% |

Creep resistance of a blend of 82% H2525A and 18% isotactic polypropylene applied to LYCRA® 940 was tested, in accordance with the test procedure in Example 1, but with one sample in which the adhesive was meltblown onto the substrate and another sample in which the adhesive was applied to the substrate in a swirl application, both at an add-on of 5 gsm. Results of these tests are shown in Table 3, below.

TABLE 3

Creeping Resistance Test Data

| Adhesive | Elastic Strand | Application | Aging Creeping |
|---|---|---|---|
| 82% H2525A/18% I-PP | LYCRA ® 940 | meltblown | 23–25% |
| 82% H2525A/18% I-PP | LYCRA ® 940 | swirl | 30–35% |

Comparing the data in Table 2, in which the adhesive was H2525A alone, with the data in Table 3, in which the adhesive included isotactic polypropylene, it can be seen that the creep resistance of the blend is much better than the H2525A alone even though the blend was applied at a reduced add-on compared to the H2525A alone.

Example 3

Laminates were made with approximately 0.4 osy polypropylene, spunbonded substrates and adhesive applied in a meltblown pattern at an application level of about 10 grams per square meter. The laminate was then run through ultrasonic-bonding equipment using the procedures described above to determine the accretion value for each of the tested adhesives.

Three different laminates were made and tested simultaneously. A first laminate was made using 100% H2525A. A second laminate was made using a blend of 18% isotactic polypropylene and 82% H2525A. A third laminate was made using a blend of 14% isotactic polypropylene and 86% NS 5610. In the second laminate, build-up on the surfaces of the anvil and horn was reduced more than 40%, to a build-up of 60%, compared to the first laminate of H2525A alone. In the second laminate, build-up was reduced by about 85%, to a build-up of about 15%, compared to the first laminate of H2525A alone.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. An elastic attachment adhesive composition comprising between about 75% and about 90% rubber based adhesive and between about 10% and about 25% crystalline polymer having a degree of crystallinity of at least about 40%, wherein the rubber-based adhesive is selected from the group consisting of styrene-isoprene-styrene, styrene-butadiene-styrene, styrene-ethylene/propylene-styrene, styrene/ethylene-co-butadiene/styrene, and styrene-poly(ethylene-propylene)-styrene-poly(ethylene-propylene), and wherein the adhesive composition is suitable for bonding together a first elastomeric substrate and a second substrate.

2. The adhesive composition of claim 1, comprising between about 80% and about 90% of the rubber-based adhesive, and between about 10% and about 20% of the crystalline polymer.

3. The adhesive composition of claim 1, wherein the degree of crystallinity of the crystalline polymer is at least about 60%.

4. The adhesive composition of claim 1, wherein the degree of crystallinity of the crystalline polymer is at least about 80%.

5. The adhesive composition of claim 1, wherein the crystalline polymer has a number-average molecular weight between about 3,000 and about 200,000.

6. The adhesive composition of claim 1, wherein the crystalline polymer has a number-average molecular weight between about 10000 and about 100,000.

7. The adhesive composition of claim 1, wherein the adhesive composition has a melt index between about 200 and about 2000 grams per 10 minutes.

8. The adhesive composition of claim 1, wherein the adhesive composition has a melt index between about 400 and about 1800 grams per 10 minutes.

9. The adhesive composition of claim 1, wherein the adhesive composition has a melt index between about 500 and about 1500 grams per 10 minutes.

10. The adhesive composition of claim 1, wherein the crystalline polymer comprises at least on of the group consisting of isotactic polymer, syndiotactic polymer, and combinations thereof.

11. The adhesive composition of claim 1, wherein the crystalline polymer comprises isotactic polypropylene.

12. The adhesive composition of claim 1, wherein the crystalline polymer is selected from the group consisting of: high density polyethylene, isotactic polystyrene, isotactic polybutene, and combinations thereof.

* * * * *

UNITED STATES PATENT AND TRADEMARK OFFICE
CERTIFICATE OF CORRECTION

PATENT NO.       : 6,872,784 B2
APPLICATION NO.  : 09/944627
DATED            : March 29, 2005
INVENTOR(S)      : Peiguang Zhou It is certified that error appears in the above-identified patent and that said Letters Patent is hereby corrected as shown below:

Column 5, line 67, "one.that" should read --one that--.

Column 7, line 62, "230°C./2.16kg" should read --230°C/2.16kg--.

Column 22, claim 6, line 24, "10000" should read --10,000--.

Column 22, claim 10, line 36, "on" should read --one--.

Signed and Sealed this

Fifth Day of December, 2006

JON W. DUDAS
*Director of the United States Patent and Trademark Office*